(12) United States Patent
Widhalm

(10) Patent No.: US 8,651,163 B1
(45) Date of Patent: Feb. 18, 2014

(54) GEOMETRIC DESIGN FOR ULTRASONIC WELDING TOOLS

(71) Applicant: Ford Global Technologies, LLC, Dearborn, MI (US)

(72) Inventor: Humi Widhalm, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/693,992

(22) Filed: Dec. 4, 2012

(51) Int. Cl.
*B32B 37/00* (2006.01)

(52) U.S. Cl.
USPC .................................. 156/580.2; 156/580.1

(58) Field of Classification Search
USPC ......... 156/73.1, 580.1, 580.2; 228/1.1, 110.1; 264/442, 443, 444, 445; 425/174.2; 310/323.01, 323.18
See application file for complete search history.

(56) References Cited

U.S. PATENT DOCUMENTS

| | | | | |
|---|---|---|---|---|
| 4,767,492 A * | 8/1988 | Fukusima et al. | ......... | 156/580.2 |
| 5,525,172 A * | 6/1996 | Cadiou | ......... | 156/73.1 |
| 6,824,630 B2 * | 11/2004 | Oishi et al. | ......... | 156/73.1 |
| 7,793,815 B2 * | 9/2010 | Shimizu et al. | ......... | 228/1.1 |
| 8,011,169 B2 * | 9/2011 | Adler | ......... | 53/371.2 |

* cited by examiner

*Primary Examiner* — James Sells
(74) *Attorney, Agent, or Firm* — Joseph E. Root

(57) ABSTRACT

Ultrasonic welding tools for joining two or more components include a horn and an anvil. The horn work surface(s) has a plurality of protrusions, each having a base, a lower portion projecting from the base, and an upper domed portion projecting from the lower portion, substantially resembling a domed cone. The anvil work surface(s) has a plurality of protrusions, each having a basal portion and an upper tapering portion projecting from the base, substantially resembling a pyramid. The span of each pyramid base is no greater than the span of each domed cone base. The geometric center of each domed cone base on each horn work surface aligns with the geometric center of the valley surrounded by four adjacent pyramids on the matching anvil work surface.

18 Claims, 11 Drawing Sheets

GEOMETRIC DESIGN FOR ULTRASONIC WELDING TOOLS

TECHNICAL FIELD

The present invention generally relates to joining techniques, and, more specifically, to ultrasonic welding (USW) technique for joining two or more components.

BACKGROUND

Ultrasonic welding is one of the techniques for joining two or more similar or dissimilar metals in the form of wires, ribbons, foils, or sheets. Recently, USW has been used to join battery cell terminals and interconnector busbars in battery modules of high-voltage (HV) battery packs for electric vehicles (EVs). An USW system comprises an electronic ultrasonic generator, an actuator, an anvil and an ultrasonic stack. The ultrasonic stack includes a converter which converts electrical signals to mechanical vibrations, a booster which modifies or maintains the amplitude of the mechanical vibrations, and a horn. During an USW process, the components to be joined are clamped between the horn and the anvil by their work surfaces. One of the components, normally the thickest one, is held stationary by the anvil, while the other component(s), usually the thinner one(s), is gripped and vibrated by the horn against the stationary component at an ultrasonic frequency of 20 to 40 kHz. The intense friction mingles the metals' atomic structures, forming thousands of solid-state atomic bonds in the weld zone, thus creating a joint.

The work surfaces of the horn and the anvil consist of patterns of protrusions or knurls. To date, the protrusions on the horn work surface(s) have been truncated pyramids. This type of work surface geometry has posed several problems. Prohibitively high energies were required for joining multiple layers of high-strength metal sheets/foils of various thicknesses and with higher-melting-temperature and/or harder coatings. Stress concentrations around the sharp edges of the truncated pyramids caused the excess thinning and/or fracture of the outermost layers in the joints made. In addition, the buildup of metal fines and the chipping of the truncated pyramids induced the process instability and shortened the life of USW tools, in particular, the life of the horn. Therefore, the design of the work surfaces of the horn and the anvil, particularly the horn, critically impacts the quality, durability and robustness of the USW joints, and influences the USW tool life and process reliability.

Accordingly, a radical tooling solution is desired to address the problems associated with the geometric design of the USW tools.

SUMMARY

The present invention provides a tooling design method and a novel geometric design for the work surfaces on the horn and the anvil of an ultrasonic welding system. The tooling design method includes the simultaneous satisfaction of the functionality, durability and manufacturability requirements of USW joints in conjunction with suitable USW process parameters. The novel geometric design provides remarkable enhancement of USW joint quality, durability and robustness, tremendous improvement of USW process reliability, and significant extension of USW tool life.

According to one aspect, the present invention provides USW tools for joining two or more components. The USW tools include a horn having at least one work surface. Each work surface includes multiple protrusions, arranged in a first matrix. Each protrusion on each horn work surface has a base, a lower portion projecting upwards from the base, and an upper domed portion projecting from the lower portion and converging to a rounded apex. The radius of the upper domed portion of each protrusion is about half of the height of the protrusion, or in general, no greater than about half of the height of the protrusion. The base of each protrusion is broader than the upper domed portion. Further, the USW tools include a matched-pair anvil having one or more work surfaces. Each work surface includes multiple protrusions, arranged in a second matrix. Each protrusion on each anvil work surface has a basal portion and an upper tapering portion sloping from the basal portion to a pointed apex. The basal portion has a span substantially equal to, or in general, no greater than the span of the base of each protrusion on the matching horn work surface. During a joining process, the geometric center of the base of each protrusion on each horn work surface aligns with the geometric center of the valley surrounded by four adjacent protrusions on the matching anvil work surface.

According to another aspect, the present invention also provides a system for joining two or more components. The system includes a horn coupled to a first component or a first group of components. The horn induces vibrations within the first component(s), and has at least one work surface having a matrix of protrusions. Each of the protrusions has a base, a lower portion projecting upwards from the base, and an upper domed portion projecting from the lower portion and converging to a rounded apex. The radius of the upper domed portion of each protrusion is no greater than about half of the height of the protrusion. The base of each protrusion is broader than the upper domed portion. Further, the system includes a matched-pair anvil coupled to a second component. The anvil firmly holds the second component stationary with respect to the first component(s), and has at least one work surface having a matrix of protrusions. Each of the protrusions has a basal portion and an upper tapering portion sloping from the basal portion to a pointed apex. The basal portion has a span no greater than the span of the base of each protrusion on the matching horn work surface. During a joining process, each anvil work surface is configured to align with the matching horn work surface. The horn protrusions and the anvil protrusions are structured, shaped and sized such that high degree of plastic deformations are generated consistently within the components being joined, significantly reinforcing the solid-state atomic bonds in the weld zone, creating robust, durable and reliable USW joints.

Additional aspects, advantages, features and objects of the present invention are made apparent from the drawings and the detailed description of the illustrative embodiments construed in conjunction with the appended claims that follow.

BRIEF DESCRIPTION OF THE DRAWINGS

FIG. 1 (*b*) is a top view of the exemplary joint of FIG. 1 (*a*), enlarged in thickness direction.

FIG. 1 (*c*) is a side view of the exemplary joint of FIG. 1 (*a*).

FIG. 1 (*d*) is an isometric view of the exemplary joint of FIG. 1 (*a*).

FIG. 2 (b) is an enlarged top view of one of the three exemplary work surfaces of FIG. 2 (a).

FIG. 2 (c) is an enlarged side view of multiple exemplary domed cones on one of the three exemplary work surfaces of FIG. 2 (a).

FIG. 4 (b) is an enlarged top view of one of the three exemplary work surfaces of FIG. 4 (a).

FIG. 4 (c) is an enlarged side view of multiple exemplary pyramids on one of the three exemplary work surfaces of FIG. 4 (a).

DETAILED DESCRIPTION OF ILLUSTRATIVE EMBODIMENTS

The following detailed description illustrates the aspects of the present invention and the best mode for carrying out the invention. However, the description does not define or limit the invention, such definition or limitation being solely contained in the claims appended thereto.

The present invention provides a tooling design method and a novel geometric design for the work surfaces on the horn and the anvil of an USW system. The novel geometric design is derived on the basis of the simultaneous satisfaction of the functionality, durability and manufacturability requirements of USW joints. Each work surface of the horn involves multiple protrusions, each of the protrusions substantially resembling a domed cone. Each work surface of the matched-pair anvil includes multiple protrusions, each of the protrusions substantially resembling a pyramid. Such geometric design, in conjunction with suitable USW process parameters, enables high degree of plastic deformations within the components being joined and highly focused applications of ultrasonic energy, leading to remarkable enhancement of USW joint quality, durability and robustness, tremendous improvement of USW process reliability, and significant extension of USW tool life.

Figure 1:
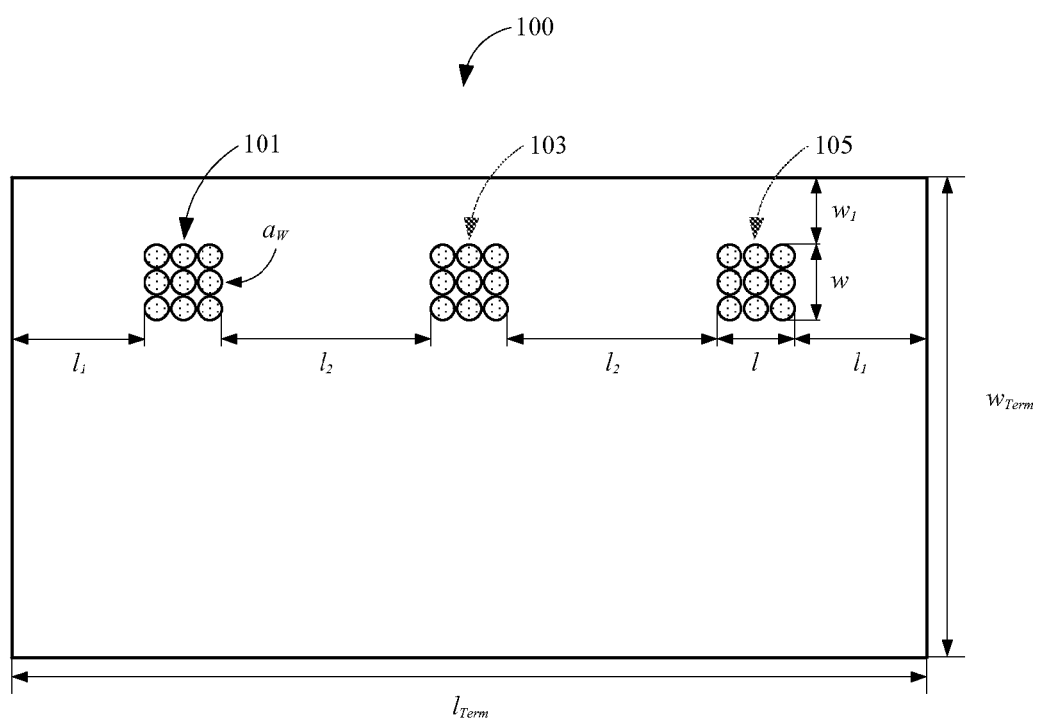
FIG. 1 (*a*) is a front view of an exemplary joint between three battery cell terminals and one interconnector busbar, in accordance with the present invention.
Figure 1:
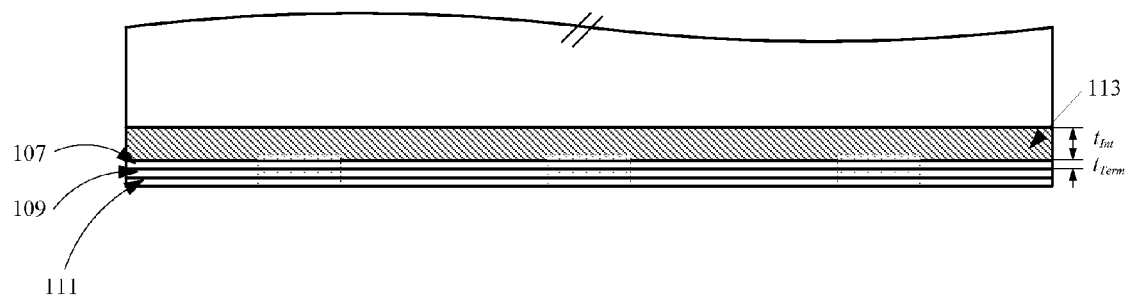
Figure 1:
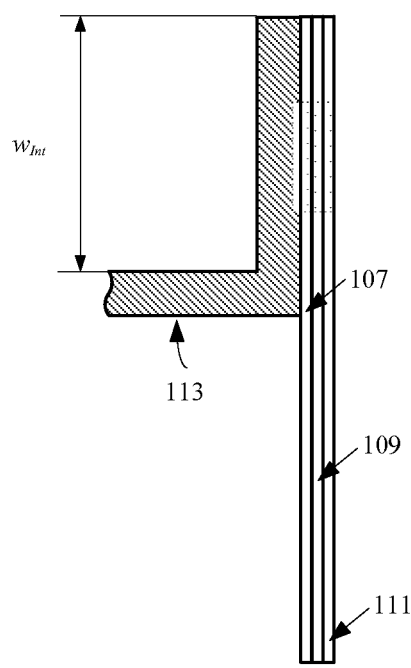
Figure 1:
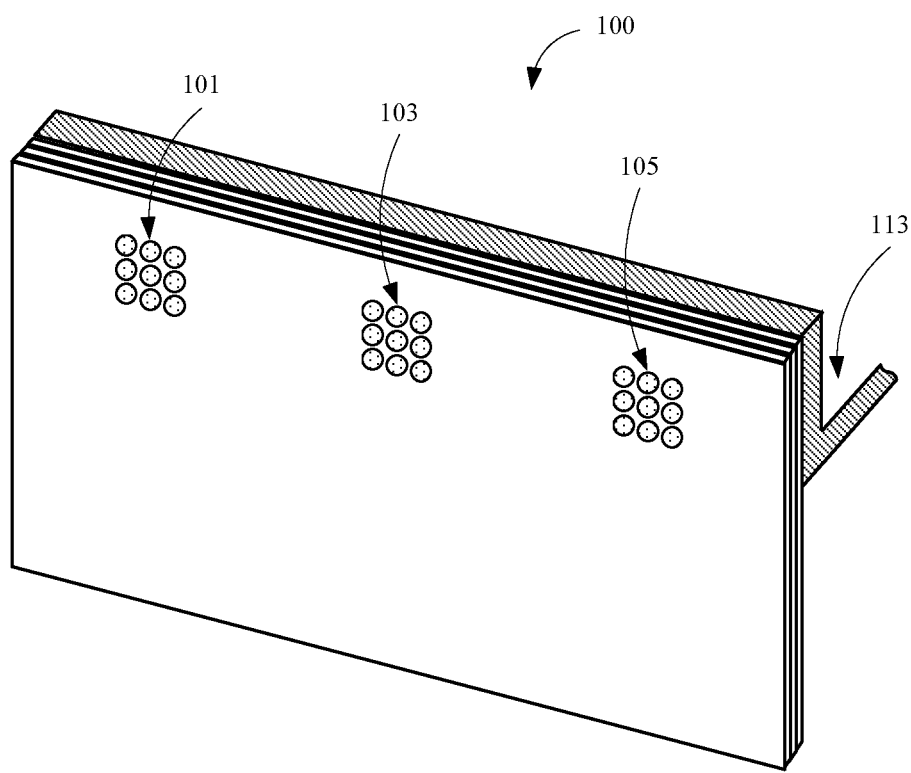

FIG. 1 depicts (a) a front view, (b) a top view enlarged in thickness direction, (c) a side view from left hand side (LHS), and (d) an isometric view from right hand side (RHS), respectively, of an exemplary joint 100. In this embodiment, the joint 100 has three welds 101, 103 and 105, between three battery cell terminals 107, 109 and 111, and one interconnector busbar 113, as formed in a battery module of a HV battery pack for EVs.

In FIG. 1 (a), $l^{Term}$ is the length and $w_{Term}$ is the width of each of the battery cell terminals; l and w are the length and the width, respectively, of each weld 101, 103 or 105; $l_1$ is the distance between either side of any battery cell terminal in the joint 100 to the nearest edge of the weld 101 or 105; $l_2$ is the distance between the edges of the adjacent welds 101 and 103, or 103 and 105; $w_1$ is the distance between the top edge of any battery cell terminal in the joint 100 to the top edge of the welds 101, 103 and 105; and $a_W$ is the area of each weld 101, 103 or 105. In FIG. 1 (b), $t_{Int}$ is the thickness of the interconnector busbar 113, and $t_{Term}$ is the thickness of each of the battery cell terminals 107, 109 and 111. In FIG. 1 (c), $w_{Int}$ is the depth of the U-channel of the interconnector busbar 113, also referred to as the depth of the interconnector busbar.

The length $l_{Term}$, the width $w_{Term}$ and the thickness $t_{Term}$ of each of the battery cell terminals 107, 109 and 111 are design input parameters and hence known dimensions. The thickness $t_{Int}$ and the depth $w_{Int}$ of the interconnector busbar 113 are also known design parameters. Other known design parameters include the thickness $t_{Film\_Term}$ of the coating or film on each surface of the battery cell terminals 107, 109 and 111, and the thickness $t_{Film_{Int}}$ of the coating or film on each surface of the interconnector busbar 113. The variables $a_W$, l, w, $l_1$, $l_2$ and $w_1$ are unknowns associated with the joint 100. These unknowns are derived for the geometric design of the work surfaces of the horn and the anvil, as described in detail below in accordance with the present invention.

The electric resistances across the joint 100 include:
(1) the constriction electric resistance $R_{Term\_C}$ across the outermost battery cell terminal 111;
(2) the bulk electric resistance $R_{Term}$ across each battery cell terminal 109 or 107;
(3) the film electric resistance $R_{Term\text{-}Term}$ across two adjacent films on the adjacent battery cell terminals 111 and 109 or 109 and 107;
(4) the film electric resistance $R_{Term\text{-}Int}$ across two adjacent films on the adjacent battery cell terminal 107 and interconnector busbar 113; and
(5) the spreading electric resistance $R_{Int\_S}$ across the interconnector busbar 113.

The constriction electric resistance $R_{Term\_C}$ across the outermost battery cell terminal 111 is calculated as follows:

$$R_{Term\_C} = C(\rho_{e\_Term} t_{Term}/a_W)/n_W \qquad (1)$$

where C is a constant that depends on the weld shape and is assumed to be approximately 0.5 due to small variability; $\rho_{e\_Term}$ is the electric resistivity of the battery cell terminals 107, 109 and 111; and $n_W$ is the number of welds in the joint 100.

The bulk electric resistance $R_{Term}$ across the thickness of each of the battery cell terminals 109 and 107 is calculated as follows:

$$R_{Term} = (\rho_{e\_Term} t_{Term}/a_W)/n_W \qquad (2)$$

The film electric resistance $R_{Term\text{-}Term}$ across the two adjacent films on the adjacent battery cell terminals 111 and 109 or 109 and 107 is calculated as follows:

$$R_{Term\text{-}Term} = (\rho_{e\_Film\_Term} 2 t_{Film\_Term}/a_W)/n_W \qquad (3)$$

where $\rho_{e\_Film\_Term}$ is the electric resistivity of the film on each surface of the battery cell terminals 107, 109 and 111.

The film electric resistance $R_{Term\text{-}Int}$ across the two adjacent films on the adjacent battery cell terminal 107 and interconnector busbar 113 is calculated as follows:

$$R_{Term\text{-}Int} = (\rho_{e\_Film\_Term} t_{Film\_Term}/a_W + \rho_{e\_Film\_Int} t_{Film\_Int}/a_W)/n_W \qquad (4)$$

where $\rho_{e\_Film\_Int}$ is the electric resistivity of the film on each surface of the interconnector busbar 113.

The spreading electric resistance $R_{Int\_S}$ across the thickness of the interconnector busbar 113 is calculated as follows:

$$R_{Int\_S} = (\rho_{e\_Int} t_{Int}/a_W)/n_W \qquad (5)$$

where $\rho_{e\_Int}$ is the electric resistivity of the interconnector busbar 113.

Summing the electric resistances calculated above yields the beginning of life (BOL) electric resistance $R_{BOL}$ across the joint 100:

$$R_{BOL} = R_{Term\_C} + (n_L - 1)(R_{Term} + R_{Term\text{-}Term}) + R_{Term\text{-}Int} + R_{Int\_S} \qquad (6)$$

where $n_L$ is the number of battery cell terminals in the joint 100.

The joint functionality requirement dictates that the BOL electric resistance $R_{BOL}$ across a joint must be less than or equal to the maximum allowable electric resistance $R_{Max}$ across the joint:

$$R_{BOL} \leq R_{Max} \quad (7)$$

The maximum allowable electric resistance $R_{Max}$ is derived based on the joint application and the component materials to be joined. In this embodiment, the maximum allowable electric resistance $R_{Max}$ is established to be 0.06 mΩ for the USW joints between the battery cell terminals made of 0.2 mm thick Al or Cu foils and the interconnector busbars made of 0.8 mm thick Cu sheets.

With the known design inputs ($t_{Term}$, $t_{Film\_Term}$, $t_{Film\_Int}$, $t_{Int}$, $n_L$), the known materials properties ($\rho_{e\_Term}$, $\rho_{e\_Film\_Term}$, $\rho_{e\_Film\_Int}$, $\rho_{e\_Int}$) and the above-derived threshold ($R_{Max}$), the only unknowns in Equation (7), after substitution by Equations (1)-(6), are the area $a_W$ of each of the welds 101, 103 and 105, and the number of welds $n_W$ in the joint 100. By solving Equation (7), the total area $a_W n_W$ of all welds in the joint is derived. The number of welds $n_W$ is dependent on several factors, primarily the size of the components to be joined. In a preferred embodiment, the number of welds $n_W$ is chosen to be three. After the number of welds $n_W$ is selected, the area $a_W$ of each weld is calculated from the total area $a_W n_W$. The dimensions l and w of each weld are then determined from the area $a_W$.

For the weld shape substantially resembling a square, the length l and the width w of each of the welds 101, 103 and 105 are equal to each other. Therefore, the length l and the width w are determined by the following Equation:

$$l = w = \sqrt{a_W} \quad (8)$$

For other weld shapes, such as rectangle, circle, ellipse and triangle, the dimensions l and w are calculated from the respective area $a_W$, as summarized in Table 1.

TABLE 1

Area of a Weld in a Joint with Various Weld Shapes

| Weld Shape | Weld Area, $a_W$ | Length and Width Relation |
| --- | --- | --- |
| Square | lw | w = l |
| Rectangle | lw | w < l |
| Circle | $\pi l^2/4$ | w = l |
| Ellipse | $\pi l w/4$ | w < l |
| Triangle | lw/2 | Equilateral $w = \frac{\sqrt{3}}{2} l$ |

For rectangular and elliptical shapes and the variants thereof, the calculations of l and w need to be conducted iteratively with the calculations of $l_1$, $w_1$ and $l_2$ based on the already-derived $a_W$ and the known design inputs ($l_{Term}$, $w_{Term}$, $w_{Int}$).

The dimension $l_1$ needs to satisfy the following constraints:

$$l \leq l_1 \leq 1.5 l \quad (9)$$

The dimension $l_2$ needs to be no shorter than 1.5 $l_1$:

$$l_2 \geq 1.5 l_1 \quad (10)$$

Further, the dimension $w_1$ needs to be longer than w, i.e., $w_1 \geq w$. However, the depth $w_{Int}$ of the U-channel of the interconnector busbar 113 poses a constraint, i.e., $w_1 + w/2 = w_{Int}/2$. Thus, the dimension $w_1$ is calculated by the following Equation:

$$w_1 = (w_{Int} - w)/2 \quad (11)$$

The geometric parameters of the joint 100 derived above ($a_W$, l, w, $l_1$, $l_2$ and $w_1$) are then used to design the work surfaces of the horn and the anvil, as detailed below.

The work surface structure of the horn or the anvil includes a single continuous plateau and multiple discontinuous islands. Each island constitutes a work surface. Both the single continuous and multiple discontinuous work surfaces have multiple protrusions thereon. The single continuous work surface is suitable for small sizes of joints, highly formable component materials, and/or single-layer joint designs. The multiple discontinuous work surfaces are suitable for medium to large sizes of joints, less formable component materials, and/or multilayer joint designs.

The work surface shape of the horn or the anvil includes square, rectangle, circle, ellipse, triangle, or variants thereof. The square and rectangle shaped work surfaces generate stress concentrations around the four corners of each shape on the tools and the joints. The circle shaped work surface(s) produces the least stress concentration. The ellipse shaped work surface(s) creates the joints with the lowest constriction electric resistance. The triangle shaped work surface(s) alleviates the formability problem of the component materials to be joined. For a given joint application, the suitable shape is determined by optimization to address the most profound problem and to maximize the benefit/cost ratio.

Depending on the structure and shape of the work surfaces, various geometric parameters need to be determined. For a single continuous work surface, the work surface area, the number of protrusions on the work surface, and the dimensions of each protrusion need to be designed. For multiple discontinuous work surfaces, the total work surface area, the number of work surfaces, the number of protrusions per work surface, and the dimensions of each protrusion need to be established.

Figure 2:
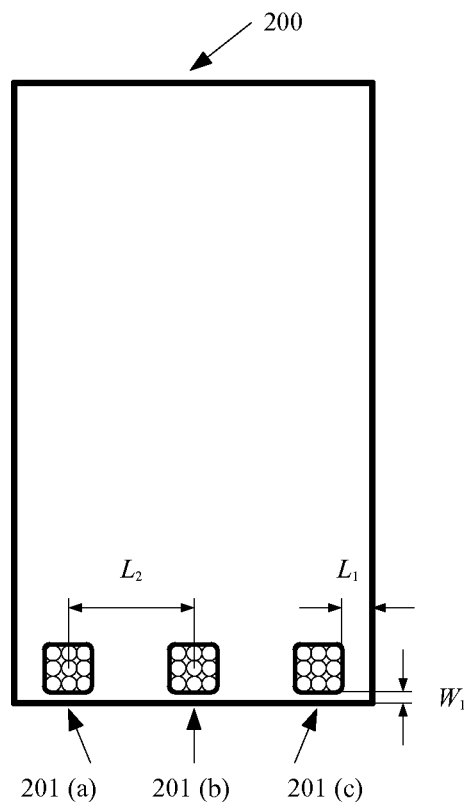
FIG. 2 (*a*) shows multiple exemplary work surfaces on an exemplary USW horn, in accordance with the present invention.
Figure 2:
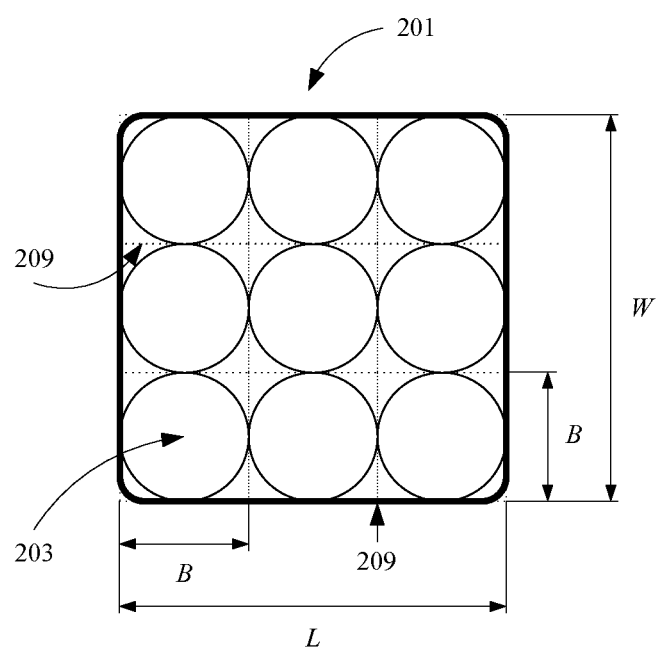
Figure 2:
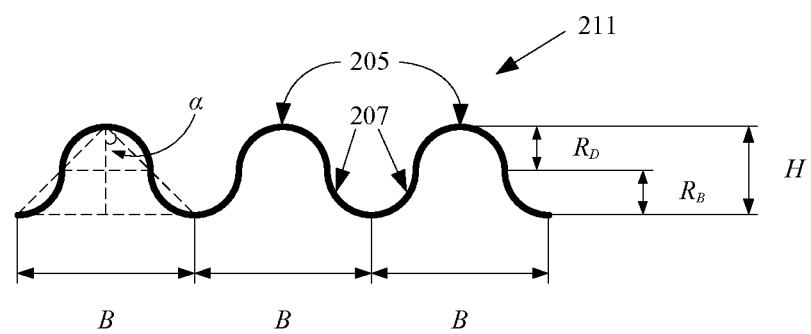

FIG. 2 (a) shows an exemplary USW horn 200. In this embodiment, the horn 200 has multiple discontinuous work surfaces 201 (a), 201 (b) and 201 (c) provided equidistantly from each other. The number of work surfaces is same as the number of welds $n_W$. The unknown dimensions to be designed include the distance $W_1$ from the lower edge of the horn 200 to the lower edge of the work surfaces 201, the distance $L_1$ from the left and the right edge of the horn 200 to the nearest edge of the work surfaces 201 (a) and 201 (c), respectively, and the distance $L_2$ between the geometric centers of two adjacent work surfaces, 201 (a) and 201 (b), or 201 (b) and 201 (c). The pitch $L_2$ is calculated as follows:

$$L_2 = l_2 + l \quad (12)$$

The dimensions $L_1$ and $W_1$ are determined based on the number of work surfaces $n_W$, the length L and the width W of each work surface, and the pitch $L_2$, once the overall geometry and dimensions of the horn are set from the considerations of the available work space and the feasibility to tune the horn to resonate at the same ultrasonic frequency as the coupled booster.

FIG. 2 (b) is an enlarged top view of one of the three exemplary work surfaces 201 on the horn 200. In the shown embodiment, the work surface 201 of the horn 200 is substantially square shaped. The unknown geometric parameters to be designed include the length L, the width W and the area $A_W$ of each work surface 201. The length L and the width W are determined by adding about 20%, or at least about 10%, to the above-derived length l and width w of each weld 101, 103 or 105 of the joint 100. Accordingly, the length L and the width W of each work surface 201 of the horn 200 are calculated as follows:

$$L = W = 1.2 \, l = 1.2 \sqrt{a_W} \quad (13)$$

The area $A_W$ of each work surface 201 of the horn 200 is then calculated as follows:

$$A_W = LW = 1.2^2 a_W \quad (14)$$

Each work surface 201 of the horn 200 includes a matrix of protrusions, substantially resembling domed cones. These protrusions are blended on and extend upwards from the circular bases 203. The grid lines 209 highlight the matrix on each work surface 201. The diameter or span B of each circular base 203 is an unknown design parameter of the work surface 201, and is derived as follows:

$$B = \sqrt{\sqrt{A_{W/N}}} = \sqrt{1.2^2 a_{W/N}} = L\sqrt{N} = 1.2l\sqrt{N} \quad (15)$$

where N is the number of protrusions on each work surface 201.

The number of protrusions N depends on several factors, such as the thickness of the battery cell terminals, the area of each work surface 201 and the area of the base 203 of each protrusion. More protrusions per work surface need to be incorporated for joining thicker battery cell terminals. Generally, the number of protrusions N is selected such that the protrusions are distributed uniformly on each work surface. For a square shaped work surface, the protrusions are distributed in a matrix of 2×2, 3×3 or 4×4. The 2×2 matrix generates 4 protrusions, the 3×3 matrix yields 9 protrusions, and the 4×4 matrix forms 16 protrusions. In a preferred embodiment, the number of protrusions N on each work surface 201 of the horn 200 is chosen to be nine, i.e., 9 protrusions on the 3×3 matrix.

FIG. 2 (c) is an enlarged side view of multiple exemplary protrusions 211 on one of the three exemplary work surfaces 201 of the horn 200. Each protrusion has a shape substantially resembling a domed cone. Each domed cone has an upper domed portion 205 and a lower portion 207. In FIG. 2 (c), a is half of the angle subtended by the rounded apex of each domed cone 211 over the extremities of its base 203; $R_D$ is the radius or the height of each dome 205; $R_B$ is the height of the lower portion 207 of each domed cone 211; and H is the height of each domed cone 211. In addition to a circular shape, the base 203 of each protrusion 211 may also take any other suitable shape, for instance, an elliptical shape or the variants thereof. In these cases, B refers to the length of the major axis of the ellipse.

In this embodiment, the angle α takes a value of about 45°. The height H of each domed cone 211 is calculated as follows:

$$H = B/2 \quad (16)$$

However, the height H of each domed cone 211 also needs to satisfy the following constraints:

$$(n_L - 1)t_{Term} \leq H \leq (n_L + 1)t_{Term} \quad (17)$$

The height $R_D$ of the upper domed portion 205 of each domed cone 211 is related to the height H of each domed cone 211:

$$R_D \leq H/2 \quad (18)$$

The height $R_B$ of the lower portion 207 of each domed cone 211 needs to be no smaller than the height $R_D$ of each dome 205:

$$R_B \geq R_D \quad (19)$$

The joint durability requirement dictates that the BOL joint strength $\sigma_{BOL}$ must be greater than or equal to the minimum allowable BOL joint strength $\sigma_{BOL\_Min}$:

$$\sigma_{BOL} \geq \sigma_{BOL\_Min} \quad (20)$$

The minimum allowable BOL joint strength $\sigma_{BOL\_Min}$ is derived based on the joint application and the component materials to be joined. In this embodiment, the minimum allowable BOL joint strength $\sigma_{BOL\_Min}$ is established to be 78 and 208 MPa, respectively, for the USW joints between the battery cell terminals made of 0.2 mm thick Al and Cu foils, respectively, and the interconnector busbars made of 0.8 mm thick Cu sheets.

Figure 3:
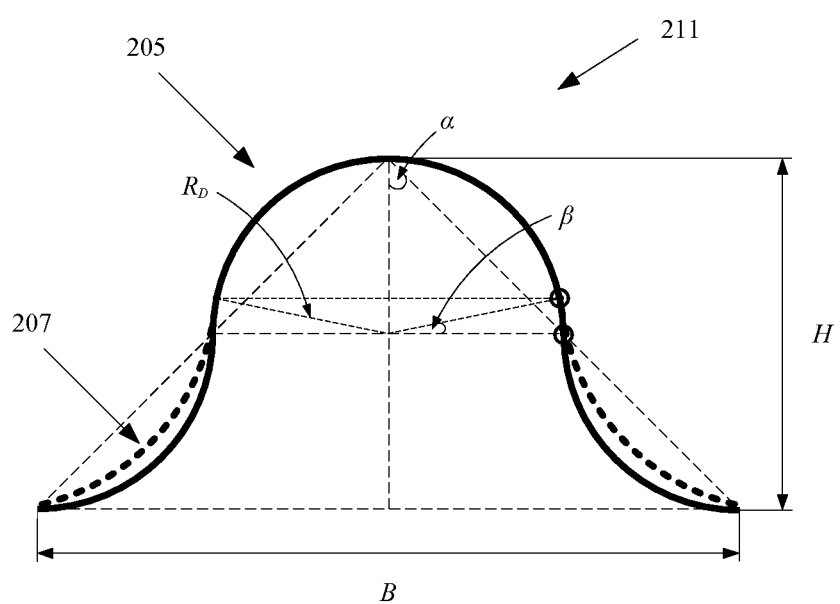
FIG. 3 is an enlarged side view of one of the nine exemplary domed cones of FIG. 2 (b), in accordance with the present invention.

FIG. 3 is an enlarged side view of one of the nine exemplary domed cones 211 provided on each work surface 201 of the horn 200. In FIG. 3, β is the angle locating the curve (in 3D) or point (when projected on 2D) on the dome 205 corresponding to the displacement of plastic deformations within the components being joined.

The joint manufacturability requirement dictates that the BOL plastic strain $\epsilon_{BOL}$ of a component material in a joint induced by USW must be less than or equal to the maximum allowable plastic strain $\epsilon_{Max}$ of the component material:

$$\epsilon_{BOL} \leq \epsilon_{Max} \quad (21)$$

The BOL plastic strain $\epsilon_{BOL}$ is determined by the following Equation:

$$\varepsilon_{BOL} = \frac{(180° - 2\beta)\pi/180°}{2\sin(90° - \beta)} - 1 \quad (22)$$

The maximum allowable plastic strain $\epsilon_{Max}$ is derived based on the mechanical properties of the thinner and/or weaker one among the component materials to be joined. In this embodiment, the maximum allowable plastic strain $\epsilon_{Max}$ is established to be 17% and 45%, respectively, for the battery cell terminals made of 0.2 mm thick Al and Cu foils, respectively.

By solving Equation (21), after substitution by Equation (22) and with the known maximum allowable plastic strain $\epsilon_{Max}$, the value of the angle β is obtained. The simultaneous satisfaction of the joint durability and manufacturability requirements is carried out in conjunction with suitable USW process parameters.

Figure 4:
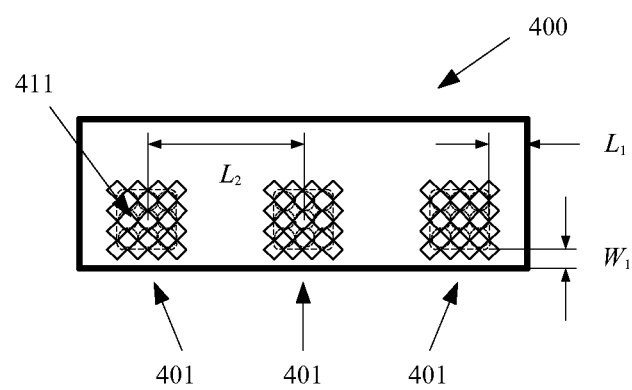
FIG. 4 (a) shows multiple exemplary work surfaces on an exemplary USW anvil aligning with the work surfaces on the USW horn of FIG. 2 (a), in accordance with the present invention.
Figure 4:
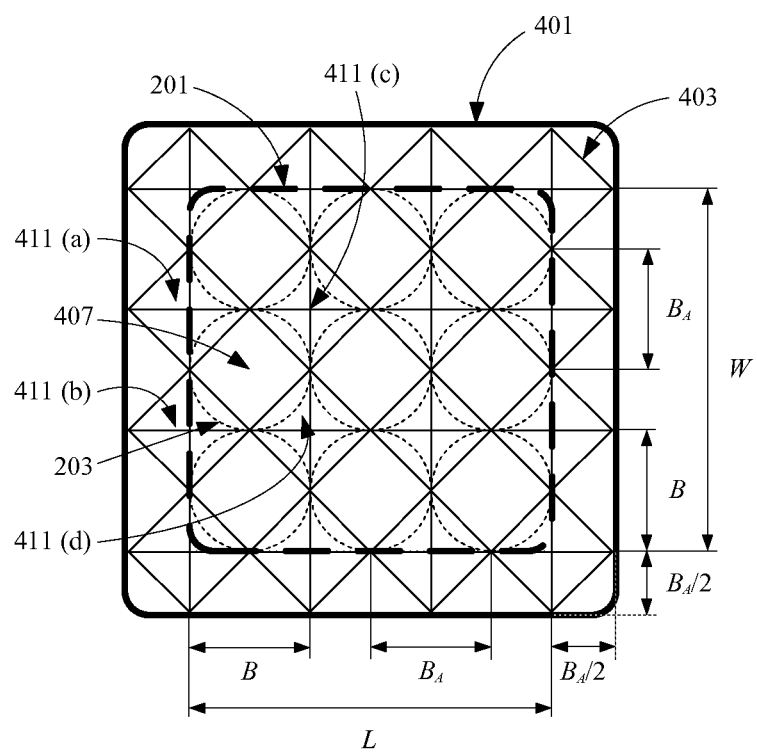
Figure 4:
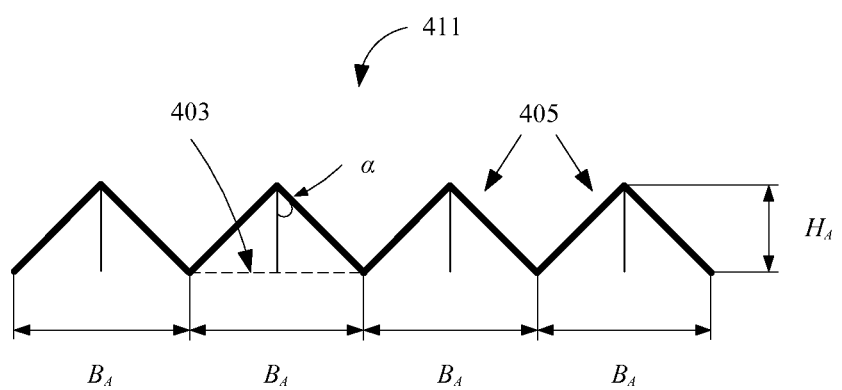

FIG. 4 (a) shows an exemplary USW anvil 400 with multiple exemplary work surfaces 401 thereon. Each work surface 401 of the anvil 400 has a matrix of protrusions 411 provided and uniformly distributed thereon. In this embodiment, each of the protrusions 411 substantially resembles a pyramid with a diamond shaped base. The multiple discontinuous work surfaces 401 on the anvil 400 match and align with the work surfaces 201 on the horn 200 such that the distance between the geometric centers of any two adjacent anvil work surfaces 401 remains substantially same as the pitch L, on the horn 200. However, since each anvil work surface 401 is larger than each horn work surface 201 beyond every side by about half of the span $B_A$ of the base of each protrusion 411, the distance between the bottom edge of each anvil work surface 401 and the bottom edge of the anvil 400 is reduced by about $B_A/2$, i.e., $W_1 - B_A/2$, and the distance between the side of the anvil 400 and the side of the nearest anvil work surface 401 is decreased by about $B_A/2$, i.e., $L_1 - B_A/2$.

FIG. 4 (b) is an enlarged top view of one of the three exemplary work surfaces 401 of the anvil 400, whereon one of the three exemplary work surfaces 201 of the horn 200 is overlaid, depicting the aligned configuration when the anvil and the matched-pair horn clamp the components being joined during an USW process. In the aligned configuration, the geometric center of the base 203 of each protrusion (domed cone) 211 on each horn work surface 201 aligns with the geometric center of the valley 407 surrounded by four adjacent protrusions (pyramids) 411 (a), 411 (b), 411 (c) and 411 (d) on the matching anvil work surface 401. The span $B_A$ of the base 403 of each pyramid 411 on the anvil work surface 401 is substantially same as the span B of the base 203 of each domed cone 211 on the horn work surface 201, i.e., $B_A \approx B$. Further, each anvil work surface 401 extends beyond each horn work surface 201 by a certain distance along every edge of the horn work surface 201. In a preferred embodiment, the edges of each anvil work surface 401 extend by a distance equal to about half of the span $B_A$ of the base 403 of each pyramid 411 on the anvil work surface 401, i.e., $B_A/2$, beyond the matching edges of the horn work surface 201.

FIG. 4 (c) is an enlarged side view of multiple exemplary protrusions 411 on one of the three exemplary work surfaces 401 of the anvil 400. Each of the protrusions 411 has a basal portion 403 and an upper tapering portion 405. The pointed apex of each protrusion 411 subtends an angle $2\alpha$ over the extremities of its base 403. This angular value is substantially same as that subtended by the rounded apex of each protrusion 211 on the matching horn work surface 201 over the extremities of its base 203. In a preferred embodiment, the value of the angle $\alpha$ is about 45°. Further, the height $H_A$ of the protrusions 411 on the anvil work surfaces 401 needs to be within the range between about 20% and 80% of the thickness $t_{Int}$ of the component that the anvil grips:

$$20\%t_{Int} < H_A < 80\%t_{Int} \quad (23)$$

If the height $H_A$ calculated from Equation (23) is smaller than the height H of the protrusions 211 on the matching horn work surfaces 201, i.e., $H_A < H$, then the span $B_A$ may become smaller than the span B, i.e., $B_A < B$, because $B_A = 2H_A$ for $\alpha 45°$. Alternatively, to keep the substantially same span, i.e., $B_A \approx B$, the angle $\alpha$ needs to be larger than 45°.

The lengths of each work surface 401 and each protrusion base 403 may be larger than their widths, i.e., each work surface 401 and each protrusion base 403 may have a rectangular or elliptical shape even for the square shaped work surfaces 201 on the matched-pair horn 200, in order to provide more clamping if the USW vibration direction is perpendicular to the length direction.

With the known design inputs, the associated materials properties, and the design method elaborated above, the geometric design is generated for the work surfaces of the horn and the anvil, satisfying the requirements and constraints set forth for the design.

Although the present invention has been described comprehensively and the best mode for carrying out the invention has been disclosed in considerable details to cover the possible aspects and embodiments, those skilled in the art to which this invention relates will recognize various alternative designs and embodiments for carrying out or practicing the invention as defined by the following claims.

What is claimed is:

1. Ultrasonic welding tools for joining two or more components, comprising:
   a horn, including:
      at least one work surface having a plurality of protrusions formed thereon, the protrusions being arranged in a first matrix, each protrusion having a base portion fixed to the work surface, a lower portion projecting and tapering from the base portion, and an upper domed portion projecting from the lower portion and converging to a rounded apex; and
   an anvil, including:
      one or more work surfaces, each anvil work surface having a plurality of protrusions formed thereon, the protrusions being arranged in a second matrix, each protrusion having a basal portion and an upper tapering portion sloping from the basal portion to a pointed apex, the apex of each anvil protrusion being aligned with a point between horn protrusions, and the apex of each horn protrusion being aligned with a point between anvil protrusions.

2. The horn of claim 1, wherein the horn has one of:
   a single continuous work surface having a plurality of protrusions distributed uniformly thereon, for generating a joint with a single weld; or
   multiple discontinuous work surfaces separated by a distance termed pitch ($L_2$), each having a plurality of protrusions provided uniformly thereon, for generating a joint with multiple welds, one weld per one work surface.

3. The horn of claim 1, wherein the single continuous work surface on the horn is centered with respect to the two sides of the horn, and the multiple discontinuous work surfaces on the horn are distributed with the overall symmetric center aligned to the symmetric axis between the two sides of the horn, the pitch ($L_2$) between any two adjacent work surfaces on the horn being substantially same as the pitch ($l_2+l$) between any two adjacent welds in the joint to be made by the horn and its matched-pair anvil, wherein $l_2$ is the distance between the nearest edges of any two adjacent welds in the joint, and l is the length of each of the welds in the joint.

4. The anvil of claim 1, wherein the anvil has one of:
   a single continuous work surface having a plurality of protrusions distributed uniformly thereon; or
   multiple discontinuous work surfaces separated by a distance termed pitch ($L_2$), each having a plurality of protrusions provided uniformly thereon.

5. The anvil of claim 1, wherein the single continuous work surface on the anvil is centered with respect to the two sides of the anvil, and the multiple discontinuous work surfaces on the anvil are distributed with the overall symmetric center aligned to the symmetric axis between the two sides of the anvil, the pitch ($L_2$) between any two adjacent work surfaces on the anvil being substantially same as the pitch ($L_2$) between any two adjacent work surfaces on the matched-pair horn.

6. The tools of claim 1, wherein the work surfaces of the horn and the matched-pair anvil are configured to align with each other such that the geometric center of each work surface on the horn is aligned with the geometric center of the matching work surface on the matched-pair anvil, all edges of each work surface of the anvil extending symmetrically outwards, beyond the corresponding edges of the matching work surface of the matched-pair horn, by at least half of the span ($B_A$) of the base of each protrusion on the anvil work surface.

7. The horn of claim 1, wherein each work surface of the horn has one of the shapes, including square, rectangle, circle, ellipse, triangle, or the variants thereof, all sharp corners of the square, rectangle, triangle or the variants thereof being rounded.

8. The anvil of claim 1, wherein each work surface of the anvil has one of the shapes, including square, rectangle, circle, ellipse, triangle, or the variants thereof, all sharp corners of the square, rectangle, triangle or the variants thereof being rounded.

9. The horn of claim 1, wherein each work surface of the horn has dimensions including length (L) and width (W):
   the length and width being equal to the diameter of a circle shaped work surface, and the width being equivalent to the height of a triangle shaped work surface;
   the dimensions (L, W) being at least about 10% larger than the corresponding dimensions (l, w) of the weld to be made, i.e., $L \geq 1.1\, l$ and $W \geq 1.1\, w$;

the dimensions (l, w) of the weld being derived from their geometric relation to the area ($a_W$) of the weld for the respective shape of the horn work surface, the area ($a_W$) of the weld multiplied by the number ($n_W$) of welds or the number of work surfaces being the total area ($a_W n_W$) of the joint to be made;

the total area ($a_W n_W$) of the joint being derived from the joint functionality requirement related to the joint application and the component materials to be joined; and the number ($n_W$) of welds or the number of work surfaces being one or more, depending primarily on the size of the components to be joined.

10. The anvil of claim 1, wherein each work surface of the anvil has dimensions including length ($L+B_A$) and width ($W+B_A$):

the length and width being equal to the diameter of a circle shaped work surface, and the width being equivalent to the height of a triangle shaped work surface;

each dimension being larger than the corresponding dimension of the matching horn work surface by at least one span ($B_A$) of the base of each protrusion on the anvil work surface; and the number of work surfaces on the anvil being one or more, and if more than one, being same as the number ($n_W$) of work surfaces on the matched-pair horn.

11. The horn of claim 1, wherein each of the protrusions on each work surface of the horn has a base portion, a lower portion projecting from the base, and an upper domed portion projecting from the lower portion and converging to a rounded apex, the projecting being along the normal vector perpendicular to the base plane and pointing outwards from the base plane, such that the geometric center of the base is aligned with the apex along the normal vector of the base plane.

12. The anvil of claim 1, wherein each of the protrusions on each work surface of the anvil has a basal portion and an upper tapering portion sloping from the basal portion to a pointed apex, the tapering being along the normal vector perpendicular to the base plane and pointing outwards from the base plane, such that the geometric center of the base is aligned with the apex along the normal vector of the base plane.

13. The horn of claim 1, wherein the protrusions on each work surface of the horn are arranged in the first matrix uniformly such that the pitch between any two adjacent protrusions is substantially same over the entire matrix, along the direction of either the row or the column in the matrix; and the number (N) of protrusions per horn work surface equals I×J, wherein I and J are the number of rows and the number of columns, respectively, in the first matrix of protrusions, I and J being any real numbers larger than zero, depending on the thickness of the components to be joined, the area of each work surface and the area of the base of each protrusion.

14. The anvil of claim 1, wherein the protrusions on each work surface of the anvil are arranged in the second matrix uniformly such that the pitch between any two adjacent protrusions is substantially same over the entire matrix, along the direction of either the row or the column in the matrix, and the pitch between any two adjacent protrusions on each anvil work surface is substantially same as the pitch between any two adjacent protrusions on the matching horn work surface, along the direction of either the row or the column in the matrices; and the number of protrusions per anvil work surface is at least (I+1)×(J+1), wherein I and J are the number of rows and the number of columns, respectively, in the first matrix of protrusions on the matching horn work surface.

15. The tools of claim 1, wherein the horn protrusions and the matched-pair anvil protrusions are sized and arranged such that the apex of each horn protrusion is aligned with the geometric center of the valley surrounded by four adjacent anvil protrusions, and the apex of each anvil protrusion is aligned with the geometric center of the valley surrounded by four adjacent horn protrusions, except for those anvil protrusions at the borders of each anvil work surface, the apex of each anvil protrusion at each border being positioned outwards at about one pitch distance from the apex of the neighboring anvil protrusion along its symmetric axis parallel to the positioning direction.

16. The horn of claim 1, wherein the base of each of the protrusions on each work surface of the horn has one of the shapes, including a circular shape, an elliptical shape, or the variants thereof.

17. The anvil of claim 1, wherein the base of each of the protrusions on each work surface of the anvil has one of the shapes, including a square shape, a rectangular shape, a circular shape, an elliptical shape, a triangular shape, a diamond shape, or the variants thereof.

18. An ultrasonic welding system for joining two or more components, comprising:

a horn coupled to a first component or a first group of components and being configured to induce vibrations within the first component(s), the horn having at least one work surface with a plurality of protrusions provided uniformly thereon, the protrusions being arranged in a first matrix, each protrusion substantially resembling a domed cone; and an anvil coupled to and firmly holding a second component stationary with respect to the first component(s), the anvil having at least one work surface with a plurality of protrusions provided uniformly thereon and configured to face and align with the matching work surface of the matched-pair horn, the protrusions being arranged in a second matrix, each protrusion substantially resembling a pyramid;

wherein the domed cones and the pyramids are structured, shaped and sized such that high degree of plastic deformations are generated consistently within the components being joined, significantly reinforcing the solid-state atomic bonding in the weld zone, creating robust, durable and reliable USW joints.

* * * * *